US005672660A

United States Patent [19]

Medsker et al.

[11] Patent Number: 5,672,660
[45] Date of Patent: Sep. 30, 1997

[54] HYDROSILYLATION CROSSLINKING

[75] Inventors: Robert Eugene Medsker, Wadsworth; Raman Patel, Akron, both of Ohio

[73] Assignee: Advanced Elastomer Systems, L.P., Akron, Ohio

[21] Appl. No.: 566,380

[22] Filed: Dec. 1, 1995

[51] Int. Cl.⁶ .................................... C08L 83/05
[52] U.S. Cl. .................. 525/101; 525/105; 525/106; 524/506; 524/190
[58] Field of Search ....................... 525/100, 105, 525/106

[56] References Cited

U.S. PATENT DOCUMENTS

| | | | |
|---|---|---|---|
| Re. 32,028 | 11/1985 | Fischer | 525/194 |
| 2,823,218 | 2/1958 | Speier et al. | 260/448.2 |
| 3,037,954 | 6/1962 | Gessler et al. | 260/29.8 |
| 3,220,972 | 11/1965 | Lamoreaux | 260/46.5 |
| 4,046,930 | 9/1977 | Johnson et al. | 427/387 |
| 4,130,534 | 12/1978 | Coran et al. | 260/33.6 AQ |
| 4,130,535 | 12/1978 | Coran et al. | 260/33.6 AQ |
| 4,578,497 | 3/1986 | Onopchenko et al. | 556/479 |
| 4,803,244 | 2/1989 | Umpleby | 525/105 |
| 4,831,081 | 5/1989 | King, III et al. | 525/105 |
| 4,916,180 | 4/1990 | Robinson et al. | 524/456 |
| 5,100,940 | 3/1992 | Wicher | 524/94 |
| 5,100,947 | 3/1992 | Puydak et al. | 524/423 |
| 5,157,081 | 10/1992 | Puydak et al. | 525/237 |
| 5,240,983 | 8/1993 | Tabata et al. | 524/261 |
| 5,384,369 | 1/1995 | Brosius et al. | 525/193 |

FOREIGN PATENT DOCUMENTS

| | | |
|---|---|---|
| 0651009 | 5/1995 | European Pat. Off. . |
| 1118327 | 7/1968 | United Kingdom . |

*Primary Examiner*—Ralph H. Dean
*Attorney, Agent, or Firm*—W. A. Skinner

[57] ABSTRACT

An improved process for the preparation of thermoplastic elastomers by hydrosilylation crosslinking, in which a platinum containing hydrosilylation catalyst is used in combination with specific diene-containing rubbers. A fully crosslinked rubber component is obtained in the thermoplastic elastomer composition.

19 Claims, No Drawings

HYDROSILYLATION CROSSLINKING

BACKGROUND OF THE INVENTION

1. Field of the Invention

This invention relates to thermoplastic elastomer compositions prepared using hydrosilylation crosslinking of the elastomer component of the composition. A thermoplastic elastomer is generally defined as a polymer or blend of polymers that can be processed and recycled in the same way as a conventional thermoplastic material, yet has properties and functional performance similar to that of vulcanized rubber at service temperatures. Blends or alloys of plastic and elastomeric rubber have become increasingly important in the production of high performance thermoplastic elastomers, particularly for the replacement of thermoset rubbers in various applications. High performance thermoplastic elastomers in which a highly vulcanized rubbery polymer is intimately dispersed in a thermoplastic are generally known as thermoplastic vulcanizates.

2. Description of the Related Art

Polymer blends which have a combination of both thermoplastic and elastic properties are generally obtained by combining a thermoplastic resin with an elastomeric composition in a way such that the elastomer component is intimately and uniformly dispersed as a discrete particulate phase within a continuous phase of the thermoplastic. Early work with vulcanized rubber components is found in U.S. Pat. No. 3,037,954 which discloses both static vulcanization of the rubber, as well as the technique of dynamic vulcanization wherein a vulcanizable elastomer is dispersed into a resinous thermoplastic polymer and the elastomer is cured while continuously mixing and shearing the blend. The resulting composition is a micro-gel dispersion of cured elastomer in an uncured matrix of thermoplastic polymer.

In U.S. Pat. No. Re. 32,028 polymer blends comprising an olefin thermoplastic resin and an olefin copolymer are described, wherein the rubber is dynamically vulcanized to a state of partial cure. The resulting compositions are reprocessible. U.S. Pat. Nos. 4,130,534 and 4,130,535 further disclose thermoplastic vulcanizates comprising butyl rubber and polyolefin resin, and olefin rubber and polyolefin resin, respectively. The compositions are prepared by dynamic vulcanization and the rubber component is cured to the extent that it is essentially insoluble in conventional solvents. A range of crosslinking, or curing, agents for the vulcanization of the rubber are described in the early art, including peroxides, sulfurs, phenolic resins, radiation, and the like.

U.S. Pat. No. 4,803,244 generally discusses the use of multifunctional organosilicon compounds in conjunction with a catalyst as an agent for crosslinking the rubber component of a thermoplastic elastomer by hydrosilylation. Hydrosilylation involves the addition of a silicon hydride across a multiple bond, often with a transition metal catalyst. This patent describes a rhodium catalyzed hydrosilylation of EPDM rubber in a blend with polypropylene to produce thermoplastic elastomers having a gel content of up to 34% (after correction for the plastic phase). This degree of vulcanization was achieved only with a high level of catalyst.

A further modification of hydrosilylation crosslinking of the rubber in a thermoplastic elastomer composition is disclosed in European Patent Application No. 651,009. A compatibilizing agent containing in the same molecule a component having an affinity for the rubber and a component having an affinity for the thermoplastic resin is incorporated into the composition, and is said to improve adhesion between the rubber and resin in order to prevent agglomeration.

SUMMARY OF THE INVENTION

The present invention is based on the discovery that the process for hydrosilylation crosslinking of the rubber in a thermoplastic elastomer can be improved by employing a platinum-containing catalyst in combination with a diene-containing elastomer having predominately sterically unhindered carbon-carbon double bonds. This combination provides rapid crosslinking of the elastomer to a fully vulcanized state, yet requires an unexpectedly low concentration of the catalyst in order to achieve the cure. In the instant invention no compatibilizer is required in order to produce compositions with excellent mechanical properties, no bubble formation and very good colorability, due to the extremely low levels of catalyst concentration. Surprisingly, lower catalyst concentrations also produce compositions with much improved heat aging characteristics In a further embodiment of the invention, additives which react with residual silicon hydride functionality in the thermoplastic elastomer are incorporated into the process. This results in a composition which has further improved long term heat aging characteristics.

The compositions produced by the improved process have utility as replacements for thermoset rubber compounds in a variety of applications, particularly where molding or extrusion is involved and the combination of thermoplastic and elastomeric properties provides an advantage. Typical uses include molded articles for automobile underhood parts, engineering and construction materials, mechanical rubber goods, industrial parts such as hose, tubing and gaskets, electrical applications and household goods.

DESCRIPTION OF THE PREFERRED EMBODIMENTS

Thermoplastic elastomer compositions may generally be prepared by blending a thermoplastic resin and a rubber, then melting the thermoplastic component and mixing the melt until the blend is homogeneous. If a composition of vulcanized rubber in a thermoplastic matrix is desired, crosslinking agents (also referred to as curatives or vulcanizing agents) are added to the blend and crosslinking occurs during the mixing. This latter process is described as dynamic vulcanization.

A wide range of thermoplastic resins and rubbers and/or their mixtures have been used in the preparation of thermoplastic elastomers, including polypropylene, HDPE, LDPE, VLDPE, LLDPE, cyclic olefin homopolymers or copolymers as well as olefinic block copolymers, polystyrene, polyphenylene sulfide, polyphenylene oxide and ethylene propylene copolymer (EP) thermoplastics, with ethylene propylene diene rubber (EPDM), acrylonitrile butadiene rubber (NBR) and natural rubber (NR) as the elastomers. When the elastomer component is crosslinked, agents such as sulfur, peroxide, phenolics and ionic compounds are often used.

Hydrosilylation Agents

Hydrosilylation has also been disclosed as a crosslinking method. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrodgen dimethylsiloxane copolymers, alkyl methyl polysiloxanes, bis(dimethylsilyl)alkanes and bis(dimethylsilyl)benzene.

Preferred silicon hydride compounds may be described by the formula

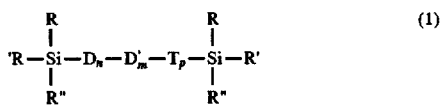

where each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl. R' represents a hydrogen atom, an alkyl or alkoxy group having from 1 to about 24 carbon atoms. R" represents R or a hydrogen atom.

D represents the group

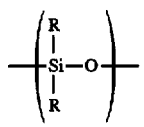

D' represents the group

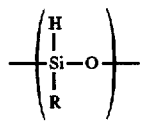

T represents the group

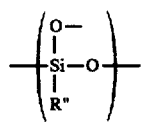

m is an integer having a value ranging from 1 to 50,
n is an integer having a value ranging from 1 to 50, and
p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes. Weight percent of alkylation should not exceed a level that does not permit adequate reaction rates due to steric constraints.

The amount of silicon hydride compound useful in the process of the present invention can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer.

Thermoplastic Resins

Thermoplastic resins useful in the compositions produced by the invention include crystalline polyolefin homopolymers and copolymers. They are desirably prepared from monoolefin monomers having 3 to 20 carbon atoms, such as propylene, 1-butene, 1-pentene and the like, as well as copolymers derived from linear and cyclic olefins, with propylene being preferred. As used in the specification and claims the term polypropylene includes homopolymers of propylene as well as reactor copolymers of polypropylene which can contain about 1 to about 20 wt % of ethylene or an α-olefin comonomer of 4 to 20 carbon atoms, and mixtures thereof. The polypropylene can be crystalline isotactic or syndiotactic polypropylene. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin found to provide useful compositions is generally from about 5 to about 90 weight percent, based on the weight of the rubber and resin. Preferably, the thermoplastic resin content will range from about 20 to about 80 percent by weight of the total polymer.

Rubbers

Unsaturated rubbers useful to prepare thermoplastic elastomers according to the invention include monoolefin copolymer rubbers comprising non-polar, rubbery copolymers of two or more α-monoolefins, preferably copolymerized with at least one polyene, usually a diene. However, unsaturated monoolefin rubber such as EPDM rubber is more suitable. EPDM is a polymer of ethylene, propylene and a non-conjugated diene or non-conjugated dienes. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB) and the like, or a combination thereof.

In one embodiment of the invention, it has been found that rubber having a structure in which the diene monomer has carbon-carbon multiple bonds which are predominately unencumbered, i.e. bonds which are sterically unhindered such as terminal or pendant double bonds, provide a greatly improved rate of cure in the hydrosilylation curing process of the invention. Included in this embodiment are structures in which the bonds either normally are unencumbered or are easily isomerized to form a sterically unencumbered double bond, which is then rapidly hydrosilated, e.g. 1,4-hexadiene or ENB. This improvement is particularly significant where a fully cured rubber component is desired. The use of rubber in which the diene component is selected from the group consisting of 5-ethylidene-2-norbornene, 5-methyl-1,4-hexadiene, 1,4-hexadiene and 5-vinyl-2-norbornene is preferred. VNB is particularly preferred as the diene component of such rubber.

Butyl rubbers are also useful in the compositions of the invention. As used in the specification and claims, the term "butyl rubber" includes copolymers of an isoolefin and a conjugated monoolefin, terpolymers of an isooolefin, a conjugated monoolefin and divinyl aromatic monomers, and the halogenated derivatives of such copolymers and terpolymers. The useful butyl rubber copolymers comprise a major portion of isoolefin and a minor amount, usually less than 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene, 4-methyl-1,4-pentadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180. Isobutylene/divinylbenzene are particularly preferred as an elastomer suitable for hydrosilylation crosslinking.

A further rubber suitable in the invention is natural rubber. The main constituent of natural rubber is the linear polymer cis-1,4-polyisoprene. It is normally commercially available in the form of smoked sheets and crepe. Synthetic polyisoprene can also be used with the particularly preferred synthetic polyisoprene elastomers being those that contain vinyl functionality pendant to the main polymer chain, i.e. 1,2-enchainments.

Polybutadiene is also a suitable elastomer for hydrosilylation curing with polybutadienes that contain vinyl functionality being the most preferred.

Blends of any of the above rubbers may also be employed, rather than a single olefinic rubber.

In preparing the compositions of the invention, the amount of rubber generally ranges from about 95 to about 10 weight percent, based on the weight of the rubber and thermoplastic resin. Preferably, the rubber content will be in the range of from about 80 to about 20 weight percent of total polymer.

Hydrosilylation Catalysts

It has generally been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight and 100 to 200,000 parts per million by weight based on the weight of rubber, respectively.

It has been found in the process of the present invention that significantly lower concentrations of platinum-containing catalyst can be used, while obtaining improvement in both the speed of the reaction and the efficiency of the crosslinking. Concentrations of catalyst in the range of about 0.01 to about 20 parts per million by weight, expressed as platinum metal, in combination with a diene-containing rubber having carbon-carbon multiple bonds which are predominately sterically unhindered, are effective in rapidly and completely curing the rubber in the process of dynamically vulcanizing blends of thermoplastic resin and rubber. Catalyst concentrations of about 0.1 to about 4 parts per million by weight based on the weight of rubber, expressed as platinum metal, are particularly preferred.

Platinum-containing catalysts which are useful in the process of the invention are described, for example, in U.S. Pat. Nos. 4,578,497; 3,220,972; and 2,823,218 all of which are incorporated herein by this reference. These catalysts include chloroplatinic acid, chloroplatinic acid hexahydrate, complexes of chloroplatinic acid with sym-divnyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred.

In order for the catalyst to function most efficiently in the dynamic vulcanization environment, it is important that it is inherently thermally stable, or that its activity is inhibited to prevent too rapid a reaction or catalyst decomposition.

Appropriate catalyst inhibitors that are suitable to stabilize the platinum catalyst at high temperatures include 1,3,5,7,-tetravinyltetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 1 to about 300 percent by weight based on the weight of the final thermoplastic elastomer product. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The type will be that ordinarily used in conjunction with the specific rubber or rubbers present in the composition, and the quantity based on the total rubber content of the thermoplastic elastomer may range from zero to several hundred parts per hundred rubber. Important to the efficiency of the catalyst is that the oils and other additives contain no or very low concentrations of compounds that interfere with the activity of the catalyst. These include phosphines, amines, sulfides or other compounds that may be classified as Lewis bases.

In another embodiment, it has been found that the heat aging properties of compositions prepared according to the invention can be greatly improved by the addition of a metal chelating agent to the blend. This effect is believed to be due to the fact that the hydrosilylation catalyst is in an active valence state. This form of the platinum metal accelerates degradation of the thermoplastic elastomer, particularly under conditions of elevated temperature over an extended time. Chelation prevents the metal from causing degradation.

Typical chelating agents useful for this purpose include materials such as 1,2-bis(3,5-di-ter-butyl-4-hydroxyhydrocirmamoyl)hydrazine and the like. These agents are incorporated into the composition prior to or after the hydrosilylation curing. Amounts of chelating agent ranging from about 0.025 parts per hundred parts of rubber (phr) to about 10 phr have been found to be useful, and amounts in the range of about 0.1 phr to 2 phr are preferred.

In a further embodiment of the invention, it has been demonstrated that reducing residual or unreacted silicon hydride functionality in the thermoplastic elastomer products results in compositions which have improved heat stability. Unreacted silicon hydride may be reduced or eliminated by reacting the silicon hydride with compounds containing active hydrogen, carbon-carbon multiple bonds, carbon-oxygen double bonds or carbon-nitrogen double bonds and the like. The residual silicon hydride reacts with these compounds to eliminate silicon hydride functionality and form silicon-oxygen or carbon-silicon bonds.

Typical compounds useful for this purpose are silica and water. These agents are incorporated into the composition after the hydrosilylation cure is complete. Water may be introduced as stem anytime after cure in a single or two pass operation. Amounts of such compounds may be estimated by measuring residual silicon hydride and adding a stoichiometric amount of the compound. One may also desire to add a stoichiometric excess if necessary to eliminate a sufficient amount of the residual silicon hydride in order to realize the desired improvement in heat aging properties. Amounts of such compounds ranging from about one mole equivalent to about 10 mole equivalents have been found to be useful, and amounts in the range of about 1 to 3 mole equivalents are preferred.

Processing

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. The rubber component can be described as fully cured when less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 5,100,947 and 5,157,081, both of which are fully incorporated herein by this reference.

The following general procedure was used in the preparation of thermoplastic elastomers by the process of the invention, as set forth in the examples. The thermoplastic resin and rubber were placed in a heated internal mixer, with the hydrosilylation agent and hydrosilylation catalyst. The hydrosilylation agent and catalyst can be incorporated into the composition by any suitable technique, for example by injection as solutions in oil or as neat components, although a dilute catalyst solution is preferred. Masterbatches of the components may also be prepared to facilitate the blending process. The mixture was heated to a temperature sufficient to melt the thermoplastic component, and the mixture was masticated until a maximum of mixing torque indicated that vulcanization had occurred. Mixing was continued until the desired degree of vulcanization was achieved.

The order of addition of the hydrosilylation agent and hydrosilylation catalyst was found to be important. Maximum catalyst efficiency was obtained when the hydrosilylation agent was added first to the blend, followed by the hydrosilylation catalyst. The mechanical properties of the thermoplastic elastomer products, as well as the degree of cure, were improved when this order of addition was followed.

The invention will be better understood by reference to the following examples which serve to illustrate but not limit the present process. In the examples, the following test methods were used to determine the properties of the thermoplastic elastomer products.

| | |
|---|---|
| Hardness (Shore A/D) | ASTM D 2240 |
| Ultimate tensile strength (UTS - psi) | ASTM D 412 |
| Ultimate elongation (UE - %) | ASTM D 412 |
| Modulus (M1 or M3 - psi) | ASTM D412 |
| Gel content (%) | ASTM D2765 |
| Tension set (TS - %) | ASTM D 412 |

The rubber component used in the compositions prepared according to the examples are further identified as follows.

| | |
|---|---|
| Rubber "A" | EPDM - 2.1% ENB; 52% ethylene |
| Rubber "B" | EPDM - 5% HD; 55% ethylene |
| Rubber "C" | EPDM - 3% VNB; 64% ethylene |
| Rubber "D" | EPDM - 1.6% VNB; 50% ethylene |
| Rubber "E" | EPDM - 0.9% VNB; 72% ethylene |
| Rubber "F" | EPDM - 3% VNB; 55% ethylene |
| Rubber "G" | EPDM - 5.5% ENB; 60% ethylene |
| Rubber "H" | EPDM - 3% DCPD; 66% ethylene |
| Rubber "I" | EPDM - 4.2% ENB; 0.3% VNB; 58% ethylene |

EXAMPLE 1

Compositions were prepared by the method of the invention as generally described above, using polypropylene resin and EPDM rubber containing ENB as the diene component. The plastic and rubber components were melt mixed in a Brabender mixer at 180° C. until the polypropylene was melted. Silicone hydride (alkylated methyl hydrogen polysiloxane) was added dropwise to the melt mix, followed by addition of an oil solution containing platinum [platinate (II) hexachloro, dihydrogen reaction product with 2,4,6,8-tetraethenyl-2,4,6,8-tetramethyl cyclotetrasiloxane]. The rubber was dynamically vulcanized by mixing the blend until the maximum torque was reached. The product was removed from the mixer, then returned to the mixer and masticated at 180° C. for an additional minute. Plaques were prepared by compression molding the products of the dynamic vulcanization at 200° C. to a thickness of 60 mil and cooling under pressure, and the physical properties were determined using these plaques. All of the products were elastomeric, as defined by ASTM D1566, i.e. all had tension set values of less than 50%. The compositions and their properties are set forth in Table I.

For the purposes of comparison, example 1 of U.S. Pat. No. 4,803,244 is also set forth. In this comparative example, similar resin and rubber components were dynamically vulcanized by hydrosilylation, but the equivalent of 35 ppm of rhodium metal was used as the catalyst.

TABLE I

|  | Composition A | Patent Ex. 1 |
|---|---|---|
| Polypropylene (parts) | 67 | 50 |
| Rubber "A" (parts) | 100 | 100 |
| Si—H (phr) | 2.5 | 6.7 |
| Rhodium (ppm) | — | 35 |
| Platinum (ppm) | 15 | — |
| Hardness (A/D) | 93/40 | 88/26 |
| UTS (psi) | 2500 | 769 |
| UE (%) | 405 | 240 |
| M1 | 1750 | 305 |
| TS (%) | 22 | 43 |
| Gel (%) (corrected for plastic phase) | 95 | 15 |

It can be seen that the use of much lower levels of platinum catalyst in the hydrosilylation crosslinking of EPDM rubber containing ENB results in a marked increase in the level of crosslinking (as reflected by gel content) and improved tensile properties in the thermoplastic elastomer, as compared to the use of rhodium as the catalyst.

EXAMPLE 2

Compositions were prepared as in Example 1, using EPDM rubber containing 1,4-hexadiene as the diene termonomer. Platinum (as in Example 1) was used as the hydrosilylation catalyst. Plaques were prepared from the products and physical properties were determined. The results are set forth in Table II.

Again for the purposes of comparison with a rhodium-catalyzed hydrosilylation, example 7 of U.S. Pat. No. 4,803, 244 is set forth. In this comparative example, a blend of polypropylene and EPDM (containing hexadiene) was dynamically vulcanized by hydrosilylation using the equivalent of 35 ppm of rhodium metal as the catalyst.

TABLE II

| Composition- | B | C | D | E | Pat Ex. 7 |
|---|---|---|---|---|---|
| PP (parts) | 67 | 67 | 67 | 67 | 50 |
| Rubber "B" (parts) | 100 | 100 | 100 | 100 | 100 |
| Si—H (phr) | 0 | 3 | 3 | 3 | 6.7 |
| Rhodium (ppm) | — | — | — | — | 35 |
| Platinum (ppm) | 0 | 7.6 | 3.3 | 1.8 | 0 |
| Hardness (D) | 32 | 39 | 39 | 37 | 25 |
| UTS (psi) | 1080 | 2210 | 2070 | 1750 | 1280 |
| UE (%) | 440 | 330 | 340 | 160 | 180 |
| M1 | 940 | 1510 | 1580 | 1620 | — |
| TS (%) | 53 | 24 | 25 | 26 | 14 |
| Gel (%) | 0 | 92 | 91 | 88 | 34 |

As demonstrated by the data set forth above, EPDM rubber containing 1,4-hexadiene as the diene termonomer is crosslinked more efficiently and completely using a platinum catalyst in conjunction with a hydrosilating agent, as compared to a rhodium catalyst. The dynamic vulcanizates prepared using the platinum catalyst have substantially higher gel content and better tensile properties, even at catalyst concentrations which are orders of magnitude lower than those required for rhodium catalyst. The rate of crosslinking was also much faster using the platinum catalyst at low concentration, in comparison to the rhodium catalyst at higher concentrations.

EXAMPLE 3

Compositions were prepared using a twin-screw extruder as the mixing means for carrying out the dynamic vulcanization. EPDM rubbers containing either 5-vinyl-2-norbornene or 5-ethylidene-2-norbornene as the diene component were used, and were dynamically vulcanized by hydrosilylation with the platinum catalyst of Example 1. Plaques were prepared from the thermoplastic elastomer products and physical properties were determined. The results are set forth in Table III.

TABLE III

| Composition[1] - | F | G | H |
|---|---|---|---|
| Polypropylene (parts) | 41 | 41 | 41 |
| Rubber "F" (parts) | 100 | 100 | — |
| Rubber "G" (parts) | — | — | 100 |
| Si—H (phr) | 2.2 | 2.2 | 3 |
| Platinum (ppm) | 4 | 2 | 13 |
| Hardness (A) | 69 | 69 | 63 |
| UTS (psi) | 1080 | 1039 | 905 |
| UE (%) | 211 | 211 | 406 |
| M1 | 636 | 606 | 408 |
| Gel (%) | >99 | >99 | 90 |

[1]The compositions also contained 130 phr paraffin oil, 42 phr clay, 5 phr wax, 2 phr ZnO Compositions F and G, which utilized VNB/EPDM, had very high crosslinking levels even though the amounts of both hydrosilylation agent and catalyst were very low. Composition H (ENB/EPDM) had a lower, but still acceptable level of crosslinking.

EXAMPLE IV

For comparative purposes, an EPDM rubber containing dicyclopentadiene was dynamically vulcanized as in Example 1, in the presence of polypropylene and using platinum catalyzed hydrosilylation curing. The results are set Forth in Table IV.

TABLE IV

| Composition - | I | J | K |
|---|---|---|---|
| Rubber "H" (parts) | 100 | 100 | 100 |
| Polypropylene (parts) | 67 | 67 | 67 |
| Si—H (phr) | 0 | 3 | 3 |
| Platinum (ppm) | 0 | 30.3 | 30.3 |
| Hardness (D) | 31 | 30 | 31 |
| UTS (psi) | 950 | 1220 | 1180 |
| UE (%) | 170 | 130 | 110 |
| M1 | 920 | 1150 | 1160 |
| TS (%) | 43 | 29 | 30 |
| Gel (%) | 18 | 76 | 77 |

High levels of hydrosilylation catalyst did not provide complete vulcanization of this which contains encumbered, i.e. internal, double bonds in the diene component.

EXAMPLE 5

Compositions were prepared using EPDM rubber containing a mixture of ENB and VNB as the diene component, using the conditions described in Example 1, and the products were compared with compositions made using the same EPDM rubber but wherein the hydrosilylation catalyst was Wilkinsoh's catalyst [chlorotris(triphenyl)phosphine rhodium (I)]. This is a rhodium catalyst of the preferred formula $LL_2RhX$ disclosed in U.S. Pat. No. 4,803,244. The compositions prepared and the physical properties of the products are set forth in Table V.

TABLE V

| Composition[1] - | L | M | N |
|---|---|---|---|
| Polypropylene (parts) | 41 | 41 | 41 |
| Rubber "T" (parts) | 100 | 100 | 100 |
| H as Si—H (grams) | 0.008 | 0.008 | 0.005 |
| Rhodium (ppm) | 39 | 79 | — |
| Platinum (ppm) | — | — | 8 |
| Hardness (A) | 56 | 55 | 64 |
| UTS (psi) | 351 | 352 | 1050 |
| UE (%) | 485 | 550 | 415 |
| M1 | 153 | 152 | 500 |
| TS (%) | 11 | 10 | 7 |
| Gel (%) | 26 | 40 | 98 |

[1]The compositions also contained 130 phr paraffin oil, 42 phr clay, 5 phr wax, 2 phr ZnO Platinum is a more efficient catalyst than rhodium for the hydrosilylation curing of EPDM rubber containing both ENB and VNB diene moieties. A 98% gel content (fully vulcanized) resulted from the use of 8 ppm platinum metal equivalent as the catalyst, whereas only 40% gel content was obtained from 79 ppm rhodium metal equivalent, under the same conditions. Superior physical properties were also obtained in the products of the platinum catalyzed hydrosilylation. Compositions prepared with a high level of Wilkinson's catalyst gave orange colored products.

EXAMPLE 6

As noted earlier, the heat aging properties of thermoplastic elastomers prepared by hydrosilylation crosslinking were found to be improved when residual Si—H functionality in the product is reacted with a compound which contains active hydrogen, carbon-carbon multiple bonds, carbon-oxygen bonds, and the like. Amorphous silica is also a compound useful for the removal of unreacted silicon hydride from the products. In this example, thermoplastic elastomer which was prepared by hydrosilylation crosslinking of the rubber component was blended in a Brabender mixer at 1800° C. with amorphous silica. A thin film sample of each thermoplastic elastomer was prepared before and after mixing with silica. An FTIR spectrum was measured for each, and the area under the peak assigned to Si—H adsorption (2061 cm$^{-1}$) was determined. The samples were then heat aged at 150° C. for 7 and 14 days and the mechanical properties measured. The results are set forth in Table VI.

TABLE VI

| Composition - | O | P | Q | R |
|---|---|---|---|---|
| Elastomer[1] (grams) | 45.8 | 45.8 | 45.8 | 45.8 |
| Polypropylene (phr) | 41 | 41 | 41 | 41 |
| Si—H (phr) | 2.7 | 2.7 | 1.6 | 2.7 |
| Platinum (ppm) | 27 | 27 | 27 | 27 |
| Silica[2] (phr) | — | 5.5 | 5.5 | 5.5* |
| Residual Si—H[3] | 2.8 | 1.5 | 1.0 | 1.5 |
| Seven days @ 150° C. | | | | |
| Hardness change (A) | 0 | 0 | +1 | +1 |
| % UTS retained | 110 | 130 | 115 | 98 |
| % UE retained | 107 | 119 | 108 | 92 |
| % M1 retained | 98 | 17 | 101 | 100 |
| Fourteen days @ 150° C. | | | | |
| Hardness change | +9 | 0 | +4 | 0 |
| % UTS retained | 17 | 84 | 55 | 42 |
| % UE retained | 2 | 73 | 47 | 35 |
| % M1 retained | — | 99 | 96 | 91 |

[1]Masterbatch consisting of 100 parts Rubber "T", 130 parts paraffin oil, 42 parts clay, 5 parts wax, 2 parts ZnO
[2]Hisil ® 233, which is a silica supplied by PPG
[3]Measured as a ratio of peak areas relative to the peak area measured for Composition Q
*Added prior to vulcanization The results indicate that as unreacted Si—H is eliminated from the compositions, the retention of physical properties after heat aging is dramatically improved.

EXAMPLE 7

Compositions prepared using transition metal catalyzed hydrosilylation are preferably stabilized using a compound which acts as a metal chelating agent. It is believed that transition metal catalyst residue is in an active valency, and this form of the metal may accelerate degradation. Chelation prevents the metal from engaging in this reaction, and long term heat aging properties of the compositions are improved by such stabilization. Two thermoplastic elastomer compositions were prepared using platinum catalyzed hydrosilylation, with one (Composition S) was stabilized by the addition of 1 part per hundred pans rubber of 1,2-bis(3,5-di-ter-butyl-4-hydroxyhydrocinnamoyl)hydrazine and one (Composition T) remaining unstabilized. The physical properties of the compositions were measured immediately upon preparation and again after heat aging at 150° C. for three and five days. The results are set forth in Table VII.

TABLE VII

| | Composition "S" | | Retention | Composition "T" | | Retention |
|---|---|---|---|---|---|---|
| | Initial | Five Days | tion | Initial | Three Days | tion |
| Hardness (A) | 67 | 67 | 100% | 69 | (cracked) | — |
| UTS (psi) | 1190 | 1287 | 108 | 1121 | 255 | 23% |
| UE (%) | 405 | 470 | 116 | 375 | 2 | 0.5 |
| M1 (psi) | 504 | 457 | 91 | 504 | — | 0 |
| M3 (psi) | 982 | 946 | 96 | 982 | — | 0 |

Properties of the composition which contained no stabilizer dropped significantly after three days at 150° C., while the composition containing a metal deactivator retained its properties even after five days at 150° C.

While the best mode and preferred embodiment of the invention have been set forth in accord with the Patent Statutes, the scope of the invention is not limited thereto, but rather is defined by the attached claims.

What is claimed is:

1. In a process for the hydrosilylation crosslinking of a composition comprising a blend of a thermoplastic resin and an unsaturated rubber by dynamic vulcanization, the improvement which comprises employing a hydrosilylation crosslinking agent and from about 0.01 to about 4 ppm, based on the weight of the rubber and expressed as platinum metal, of a platinum-containing hydrosilylation catalyst in combination with an EPDM rubber containing 5-vinyl-2-norbornene as a diene monomer, whereby a fully crosslinked rubber is obtained in a matrix of thermoplastic resin.

2. The process of claim 1 wherein the thermoplastic resin is a polyolefin resin.

3. The process of claim 1 wherein the platinum-containing hydrosilylation catalyst is selected from the group consisting of chloroplatinic acid, complexes of chloroplatinic acid with sym-divinyltetramethyldisiloxane, and dichloro-bis(triphenylphosphine) platinum (II).

4. The process of claim 1 wherein the hydrosilylation catalyst is a zero valent platinum metal complex.

5. The process of claim 1 wherein the rubber is crosslinked to the extent that less than about 5 percent by weight of the crosslinkable rubber can be extracted from the thermoplastic elastomer product by a rubber solvent.

6. The process of claim 1 wherein the hydrosilylation catalyst is incorporated into the process subsequent to the hydrosilylation crosslinking agent.

7. The process of claim 1 which further comprises incorporating into the thermoplastic elastomer a metal chelating agent.

8. The process of claim 7 wherein the metal chelating agent is 1,2-bis(3,5-di-ter-butyl-4-hydroxyhydrocirmamoyl) hydrazine.

9. The process of claim 1 which further comprises incorporating into the thermoplastic elastomer a compound which reacts with residual silicon hydride.

10. The process of claim 9 wherein the incorporated compound is silica.

11. A thermoplastic elastomer product produced by the process of claim 1.

12. A molded or extruded article comprising the product of claim 11.

13. A process for the production of a thermoplastic elastomer composition, which process comprises the steps of:

a) mixing a thermoplastic resin and an EPDM rubber containing 5-vinyl-2-norbornene as a diene monomer component, b) adding a hydrosilylation agent to the mixture from (a), c) blending the mixture from (b) at a temperature sufficient to cause the mixture to flow, d) incorporating into the mixture a platinum-containing hydrosilylation catalyst in an amount ranging from about 0.01 to about 4 parts per million parts of rubber, based on the weight of the rubber and expressed as platinum metal, and e) masticating the mixture from (d) until the rubber is fully crosslinked.

14. The process of claim 13 wherein the hydrosilylation catalyst is a zero valent platinum metal complex.

15. In a thermoplastic elastomer composition comprising a blend of thermoplastic resin and unsaturated EPDM rubber which has been crosslinked by dynamic vulcanization, the improvement comprising a composition in which the rubber contains 5-vinyl-2-norbornene as a diene monomer, and is crosslinked using a hydrosilylation crosslinking agent an from about 0.01 to about 4 ppm, based on the weight of the rubber and expressed as platinum metal, of a platinum-containing hydrosilylation catalyst.

16. The composition of claim 15 wherein the thermoplastic resin is polypropylene.

17. The composition of claim 15 wherein the hydrosilylation catalyst is a zero valent platinum metal complex.

18. The composition of claim 15 wherein the platinum-containing hydrosilylation catalyst is selected from the group consisting of chloroplatinic acid, complexes of chloroplatinic acid with sym-divinyltetramethyldisiloxane, and dichloro-bis(triphenylphosphine) platinum (II).

19. The composition of claim 15 wherein the rubber is crosslinked to the extent that less than about 5 percent by weight of the crosslinkable rubber can be extracted from the thermoplastic elastomer product by a rubber solvent.

* * * * *